INVENTORS.
JOACHIM BERGEMANN
WALTER KNOESS
BY Alfred Stapler
ATTORNEY.

3,511,906
PROCESS FOR PRODUCING A PRESSURE-RESISTANT, EDGE-SEALING MOUNTING FOR POROUS DISCS
Joachim Bergemann, Frankfurt am Main, and Walter Knoess, Kelkheim, Taunus, Germany, assignors to Varta Aktiengesellschaft Hagen, Westphalia, Germany, a corporation of Germany
Filed Sept. 10, 1965, Ser. No. 486,287
Claims priority, application Germany, Sept. 19, 1964, V 26,808
Int. Cl. B32b 31/06
U.S. Cl. 264—262
6 Claims

ABSTRACT OF THE DISCLOSURE

A mounting for a porous body in a holder, useful, for example, as an electrode in a fuel cell formed by filling the pores of the body with a liquid before or after centering it in the holder, and introducing a synthetic resin in fluid state in the space between the outer edge of the porous body and the inner edge of the holder until the liquid in the outer edge portion only of the porous body is displaced by the resin, after which the resin is hardened to form a bond between the porous body and the holder only at the outer edge portion of the porous body, leaving the remaining pores of the body unoccupied by the resin.

---

Figure 1:
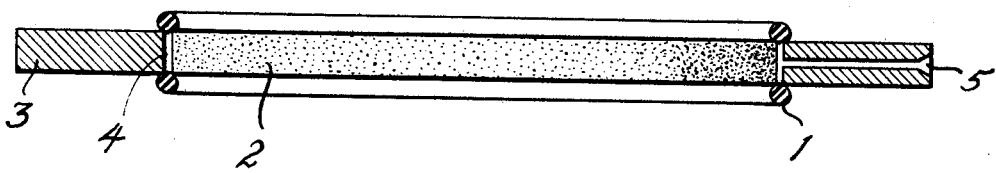

The present invention relates to a pressure-resistant and edge-sealing mounting for porous materials, such as discs and to a process for the manufacture thereof. In particular, the invention relates to a process for making an electrode useful, for instance in fuel cells, and to the new electrode itself.

It has been known to mount porous bodies tightly in rings, pipes, and in holders generally. This has been done by welding, soldering or alloying. Such mounting is difficult and expensive since it can be carried out only by skilled labor and requires the use of materials which are insensitive to high temperatures. It has also been attempted to mold fluid plastic material around porous discs made of a different plastic, or of metal, in order to provide edge-sealing mountings for these discs. However, it was observed that large areas of the mountings remained penetrable, or porous. When porous bodies were mounted in a frame, in conventional manner, by means of a resin the capillary action of the pores caused the mounting material to continue its penetration further into the body. As a result, the spaces between the body and the holder were no longer completely filled and no edge-sealing mounting was present. Moreover, the porous cross-section of the body was considerably reduced.

It is therefore an object of the invention to provide, for use at relatively low temperatures, porous bodies of metal or plastic with mountings of different metal or plastic which are edge-sealing and capable of resisting elevated pressures. An important object is an electrode body so mounted and sealed.

It is another object to provide a particularly simple and efficient process for the above-stated purpose.

These and other objects which will appear are accomplished by filling the space between the inner edge of a suitable mounting for the porous body and the outer edge of that porous body, including the pores in said edge, with a flowable material in such a manner as to leave no voids or cracks. This material is one which hardens, or sets, to form, wherever it contacts the holder and the porous body, a gas- and liquid-tight seal.

In a preferred embodiment, the assembly, including the mounting of the invention, is manufactured by filling the pores of the porous body with a fluid. At this stage, the porous body may be within its holder, or the porous body may then be placed within the holder. A flowable material is then introduced into the space between the porous body and the holder. Advisedly, this space is previously sealed from above and below to preclude loss of the flowable material.

The introduction of flowable material is continued until it has filled the space between the porous body, such as the disc and its holder, and also has penetrated into the pores in the edge of the porous body, displacing the liquid with which these pores had previously been filled. Preferably, the flowable material is introduced into the space between the porous body and its holder under pressure. Whether pressure is needed at all, or the amount of pressure, depends on the viscosity of the flowable material, the size of the pores, the speed and extent of penetration desired, the temperature at which this step is performed, and other such factors. For instance, the pressure may range from 1 to about 150 p.s.i.

The flowable material is then caused, or permitted to harden, whereupon it forms, in conjunction with the holder, the desired pressure-resistant and edge-sealing mounting for the disc, or other porous material.

The liquid which is used to fill the pores in the porous body may be organic or inorganic. Since the function of this fluid is to minimize, retard or prevent the penetration of the pores by the flowable, hardenable material, a great variety of liquids are available for selection depending on the particular circumstances and the use intended for the porous material. Of course, the fluid should be inert with respect to the holder, the porous material and the flowable, hardenable material. Thus, for instance, when the porous material is intended for use as an electrode in fuel cells, it is especially convenient to use as the fluid for the porous material various alcohols (aliphatic, aromatic), such as methanol, ethanol, 2-aminoethanol, isopropanol, n-propanol, butanol, pentanol, hexanol, octanol, n-tetradecanol, benzyl alcohol, allyl alcohol, including polyols (including dihydric phenols) such as ethylene glycol, sorbitol, glucose, ethers such as ethyl ether, acids such as formic acid. When the porous material is used as an electrode, it is advantageous to use as the fluid one that is compatible with, or is the fuel in a fuel cell. Amongst the inorganic liquids water is a suitable fluid. There may be used alkaline liquids, aqueous or alcoholic bases, such as potassium or sodium hydroxide. Other suitable liquids include aromatic or parafinic hydrocarbons, esters, ethers and the like which are inert, with respect to the materials used, as described above.

In accordance with the invention, the liquid is allowed to fill the pores of the porous material. Generally, the porous body is saturated with the liquid, i.e. essentially all the pores thereof are filled with the liquid. The hardenable material, such as the resin, establishes an equilibrium with the liquid which is strongly held by surface tension in the multitude of pores, thus preventing further penetration of the hardenable material into the pores located more inwardly in the porous material.

After the introduction and hardening of the flowable, hardenable material, the liquid can be removed from the pores or it may be allowed to remain therein, depending on the use intended of the porous body. If removal is desired, the liquid can be removed by evaporation, for instance. As explained above, certain liquids like a glycol, need not be removed since they are compatible with the use intended of the porous body.

The porous body itself can be of any desired shape, or made of any organic or inorganic material. It may be a porous metal, ceramic, a silicate, of magnesium oxide, a synthetic organic resin, coal, and of other porous composition. It may be shaped as a disc, a rod, a sheet or any other suitable shape. The invention is especially valuable for making holdings for porous bodies of complex or rounded shapes.

The flowable material which is used for the edge-connection between the porous material and the holder, is a material which is capable of hardening into a gas- and liquid-impermeable material. Ideally suited for such purposes are organic resins such as thermosetting resins; included in this group are the resins which form the desired hard material with little or no heat or which are formed by the application of heat. Typical of such suitable resins are epoxy resins, unsaturated polyester resins, urethane resins, alkyds, formaldehyde condensates with phenol or with urea or melamine, silicone resins, and the like. Thermoplastic resins that have adequate resistance to heat and pressure may also be used. It is highly desirable that the hardenable material be dimensionally stable as it hardens. Otherwise, the mounting is not adequately edge-sealing. For instance, it is evident that for these reasons it is preferable that the resin contain a minimum of solvent that is susceptible of evaporation during the hardening of the resin.

In accordance with the present invention, while the porous body is being saturated with a liquid such as ethylene glycol and flowable material is squeezed under pressure between the body and holder, a part of the liquid is radially displaced from an annular edge portion of the body. The flowable material such as the resin penetrates into the pores of that edge portion, and fills them, thereby forming a continuous ring-shaped zone and also forming an edge-sealing connection to the holder. The higher the porosity of the body, the wider it is preferred to make this sealed, ring-shaped zone. The remaining pores do not provide any significant capillary action since they are filled with liquid.

Figure 3:
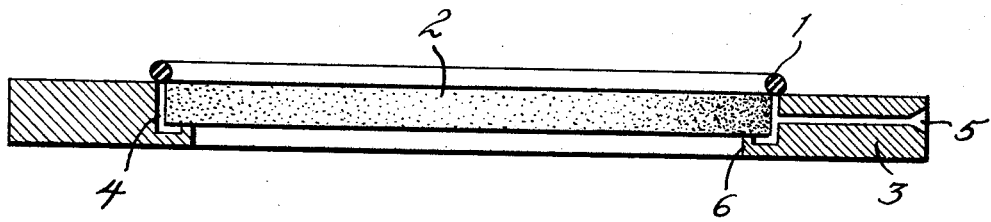

In the accompanying drawings:
FIG. 1 shows one form of the invention,
FIG. 2 shows an enlarged view of a portion of FIG. 1, and
FIG. 3 shows another embodiment of the invention.

Referring to FIG. 1, there is shown therein, in cross-section, a gas diffusion electrode 2 saturated with ethylene glycol and a holder 3. Temporary and reusable gaskets, or sealing rings 1 close off the ring-shaped gap 4 between electrode and holder. The whole arrangement is tightly held between two plates (not shown) so that the gaskets or sealing rings are pressed against the holder and the electrode, thus centering said electrode and keeping it in place during the injection and hardening process. In the holder there is a passage 5 terminating in gap 4, through which the adhesive is injected under pressure.

To achieve uniform radial pressure distribution during mounting, especially for electrodes of large diameter, several passages 5 may be provided. The resin then displaces the liquid in a ring-shaped zone, fills the pores along the edge and causes this continuous, ring-shaped zone to adhere in gas- and liquid-tight fashion to the holder.

Figure 2:
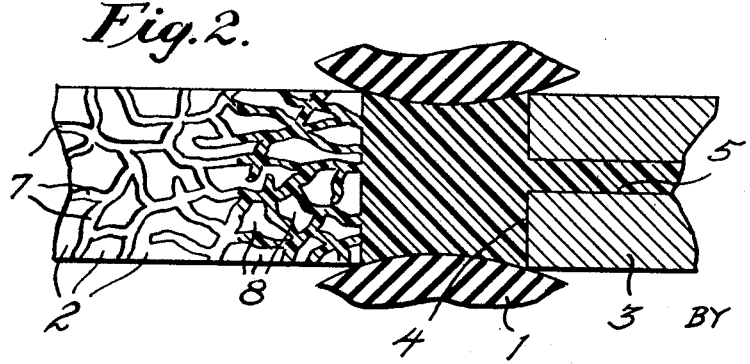

FIG. 2, to which reference may now be had, shows an enlarged view of the edge portion of the mounting shown in FIG. 1. The same reference numerals are used to designate corresponding elements in both figures. The pores 7 in the porous disc 2 are diagrammatically represented in FIG. 2. As shown by appropriate cross-hatching within the pores 7, within space 4 and within passage 5 it is these regions which are all filled with the flowable material previously discussed, of which epoxy resin is an example. On the other hand, it is the pores 7 beyond the edge portion and inwardly thereof which are filled with liquid, such as ethylene glycol. This liquid initially filled all the pores, having been displaced from those in the ring-shaped edge portion by penetration of the flowable material, introduced under pressure via passage 5 and space 4.

It should be noted that the flowable material, upon being introduced via passage 5, first displaced the air trapped in space 4. This is accompanied by the formation of moisture on the exposed surfaces of the porous body, due to the displacement of saturating liquid. The introduction of epoxy resin is there continued until it penetrates to a suitable depth into the porous electrode body, for instance, about 3 mm. The depth of penetration desired can be readily determined from the volume of liquid expelled from the porous body.

Once the desired penetration has been achieved, the flowable material is allowed to harden, as by exposure to heat. For epoxy resin this may be accomplished by placing the structure in a drying chamber of from about 100° C. to about 150° C. for a period of approximately 30 minutes. Other materials, in particular other resins may be hardened by other means, as by the influence of a suitable polymerization catalyst.

In addition to being provided with a mounting, which is edge-sealing, electrodes constructed in accordance with this invention also exhibit high mechanical resistance to unilateral pressure, such as is exerted upon gas diffusion electrodes by the electrochemically transformable gases in their gas chamber.

In the embodiment of FIG. 3, to which reference may now be had, the liquid saturated gas diffusion electrode 2 has its finely porous covering layer resting on lip 6 of holder 3. In this way, the mechanical resistance to the application of unilateral pressure is further enhanced. The edge-sealing mounting process is carried out as previously described in connection with FIGURE 1.

The method described above is repeated using methanol. A rigidly mounted electrode is obtained.

Likewise, the epoxy resin is replaced by a polyester resin with similar results.

Although described in its application to the insertion of a gas diffusion electrode into its mounting, it will be understood that the process according to this invention is susceptible of a wide variety of other applications, such as to sheets, tubings, rods and various other porous materials of different shapes and configurations. It is especially well suited for brittle materials and those having lateral surfaces which are small relative to the bottom and top surfaces.

It will also be understood that the materials and other parameters previously described are susceptible of variation depending on the application.

Although the use of a saturating liquid for the porous body is preferred, it is even possible to omit that liquid. In that case the flowable material should be one of high viscosity so that capillary action of the empty pores will not cause the material to penetrate into the pores which are located away from the annular edge portion of the disc. Materials suitable for this purpose include an epoxy resin and a hardening agent sold by Union Carbide Corporation under the designations ERL 2774 diglycidyl ether of bis phenol A and ERL 2793, amine-containing hardener for epoxy resins, respectively.

We claim:
1. A process of fixedly mounting a porous body within a holder comprising:
   filling the pores of the porous body with a liquid,
   filling the space between the inner edge of the holder and the outer edge of the porous body with a synthetic resin in fluid state so that the liquid is displaced by the resin only in the outer edge portion of the porous body:
   and hardening the resin so that it bonds to the outer edge portion of the porous body.
2. The process of claim 1 wherein the resin is hardened by thermosetting.
3. The process of claim 1 wherein the displaced liquid is forced out through the open surfaces of the porous body and the quantity thereof is used to control the amount of synthetic resin introduced.
4. The process of claim 1 wherein the synthetic resin is introduced under pressure.
5. The process of claim 1 wherein the liquid is ethylene glycol or methanol and the resin is an epoxy resin.

6. The process of claim 1 wherein the liquid is removed from the pores after the resin has hardened and has bonded to the porous body.

References Cited

UNITED STATES PATENTS

| | | | |
|---|---|---|---|
| 1,605,205 | 11/1926 | Bellamy | 264—262 XR |
| 3,077,639 | 2/1963 | Singer et al. | 264—265 XR |
| 3,223,555 | 12/1965 | Solomon et al. | 136—120 XR |
| 3,320,092 | 5/1967 | Uline | 136—120 XR |

FOREIGN PATENTS 1,310,419  10/1962  France.

ROBERT F. BURNETT, Primary Examiner

R. O. LINKER, Jr., Assistant Examiner

U.S. Cl. X.R.

136—120; 156—156, 293; 264—265, 274